United States Patent [19]

Lizzio

[11] 4,281,736
[45] Aug. 4, 1981

[54] METHOD AND APPARATUS FOR AUTOMATICALLY APPLYING AND RELEASING AUTOMOTIVE TYPE PARKING BRAKES

[76] Inventor: Vincent P. Lizzio, 45 Moorland Dr., Grosse Pointe Shores, Mich. 48236

[21] Appl. No.: 30,695

[22] Filed: Apr. 16, 1979

[51] Int. Cl.³ .............................................. B60K 41/26
[52] U.S. Cl. .................................. 180/271; 74/512; 188/106 R; 192/4 A
[58] Field of Search ........................ 180/271, 272, 275; 188/265, 106 R, 110; 192/3 R, 3 H, 4 A, 8 R, 8 A, 9; 74/512, 516, 532, 539, 483 R, 479

[56] References Cited

U.S. PATENT DOCUMENTS

| | | | |
|---|---|---|---|
| 1,876,498 | 9/1932 | Hawkins | 74/539 |
| 2,821,275 | 1/1958 | Martin | 192/4 A |
| 3,116,815 | 1/1964 | Chapman | 192/4 A |
| 3,119,477 | 1/1964 | Ryder | 180/271 |
| 3,593,815 | 7/1971 | Inoue | 180/271 |
| 3,830,328 | 8/1974 | Schafer et al. | 180/271 |
| 3,831,698 | 8/1974 | Fontaine | 180/271 |
| 3,831,703 | 8/1974 | Fontaine | 180/271 |
| 3,875,820 | 4/1975 | Morden | 74/512 |
| 3,937,295 | 2/1976 | Wright | 180/271 |
| 4,187,935 | 2/1980 | O'Hern | 180/271 |

FOREIGN PATENT DOCUMENTS

656581  1/1963  Canada ................................ 192/4 A

Primary Examiner—David M. Mitchell
Attorney, Agent, or Firm—Dolgorukov and Dolgorukov

[57] ABSTRACT

The specification discloses a novel method for automatically applying the parking brake of a vehicle when its transmission is placed in a first predetermined position, such as the park position for automatic transmission vehicles or in neutral for gearshift equipped vehicles. An apparatus, which either may be an integral part of the original equipment for newly manufactured cars, or a bolt-on after market device attached by suitable means to the parking brake assembly, moves the parking brake pedal arm in such assembly down to apply the brake. When the transmission lever is moved to a second predetermined position, such as the reverse or the neutral position, the lever arm which acted on the parking brake pedal arm to apply the device is released and the car is started, then the operator either manually releases the parking brake in the normal manner, or in cars equipped with an automatic parking brake release, the parking brake itself will be automatically released when the driver places his foot on the service brakes before shifting, allowing the car to be driven in the normal manner.

12 Claims, 17 Drawing Figures

METHOD AND APPARATUS FOR AUTOMATICALLY APPLYING AND RELEASING AUTOMOTIVE TYPE PARKING BRAKES

The present invention relates to the device for immobilizing vehicles when they are parked, and more particularly to a device which will automatically apply the parking brake of a vehicle when its transmission is placed in a first predetermined position.

In the past, when the automobile was in its infancy, it was not equipped with a parking brake or like device, and having only a manual transmission many times the only way the car was held stationary was to place the transmission in one of its geared positions. This was fine while the vehicle was on a level surface, but did nothing for the vehicle when it was on an inclined surface, as the forces acting on the vehicle would easily overcome the friction provided by the engine.

It soon became evident that auxiliary means were needed to hold the vehicle stationary, and the device known as the parking brake came into being which mechanically activated one or more brake shoes on the vehicle upon pulling of the parking brake handle, which was first located on the floor of the vehicle and then moved under the dashboard of the vehicle as time progressed.

However, just because this device was available did not mean that all drivers would use it, and some drivers being somewhat lethargic, still continued to put the car into the geared position or, not even in a geared position at all, leaving the vehicle free to roll on an incline and causing many accidents. However, as long as the parking brakes of the vehicles were manually controlled, there appeared to be little solution to this problem, and a long standing search in the art for a way of automatically applying this device continued without solution.

With the advent of the automatic transmission equipped vehicle, however, it was not long until a solution which was thought to provide an answer to this problem was forthcoming. This solution was to provide a pawl which automatically dropped into place and which interacted with a gear in such transmission rendering the driving members of the transmission, and thus the vehicle, immobile. Thus, the driver could place the transmission in to the park position, and achieve the same effect as he otherwise would have by applying the parking brake, in a much easier fashion, and this is what a majority of drivers did even though it was recommended that they not rely solely on the transmission to hold the vehicle stationary, and the parking brake continued to be standard equipment. While this proved to be a generally satisfactory solution to the problem, and the only accidents which happened occurred in documented cases where the transmission lever was accidently bumped out of the park position, it has in recent days become apparent that an additional problem is present due to the faulty design of some automatic transmissions by some of the automobile companies, and transmissions have been jumping out of the park position into reverse while the engine is running, causing several accidents, many of them fatal, when the operator of the vehicle is struck by the car when the transmission jumps out of gear and moves into reverse. Thus, the problem of rendering a vehicle immobile by a foolproof method when it is not in motion is still a long standing problem in the art, and it is one of the objects of the present invention to finally solve this problem.

Another object of the present invention is to provide a method and apparatus which allows the removal of the parking pawl from an automatic transmission equipped vehicle while still providing a foolproof way of rendering the vehicle immobile.

Another object of the present invention is to provide a method and apparatus which uses the park position of an automatic transmission to activate mechanisms which render the vehicle immobile.

Another object of the present invention is to automatically apply the parking brake of a vehicle when the automatic transmission lever is placed in a first predetermined position.

Another object of the present invention is to provide a method and apparatus which renders a manual transmission equipped vehicle immobile when its gearshift lever is put in the neutral position.

A still further object of the present invention is to provide an apparatus of the foregoing nature which can either be installed as original equipment on a motor vehicle, or be embodied in a built-in unit which can be installed on cars already in use.

Another object of the present invention is to provide an apparatus for rendering a motor vehicle immobile when it is not being operated which allows a removal of the parking pawl of the automatic transmission, if desired.

Another object of the present invention is to provide a method and apparatus which will automatically apply the service brakes of a motor vehicle when the transmission lever thereof is placed in a first predetermined position.

A further object of the present invention is to provide a method and apparatus for rendering a motor vehicle immobile when in its inoperative state, which is relatively simple and inexpensive to manufacture.

Further objects and advantages of this invention will be apparent from the following description and appended claims, reference being made to the accompanying drawings forming a part of the specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that phraseology and terminology employed herein is for the purpose of description and not of limitation.

Figures 1, 2, 3:
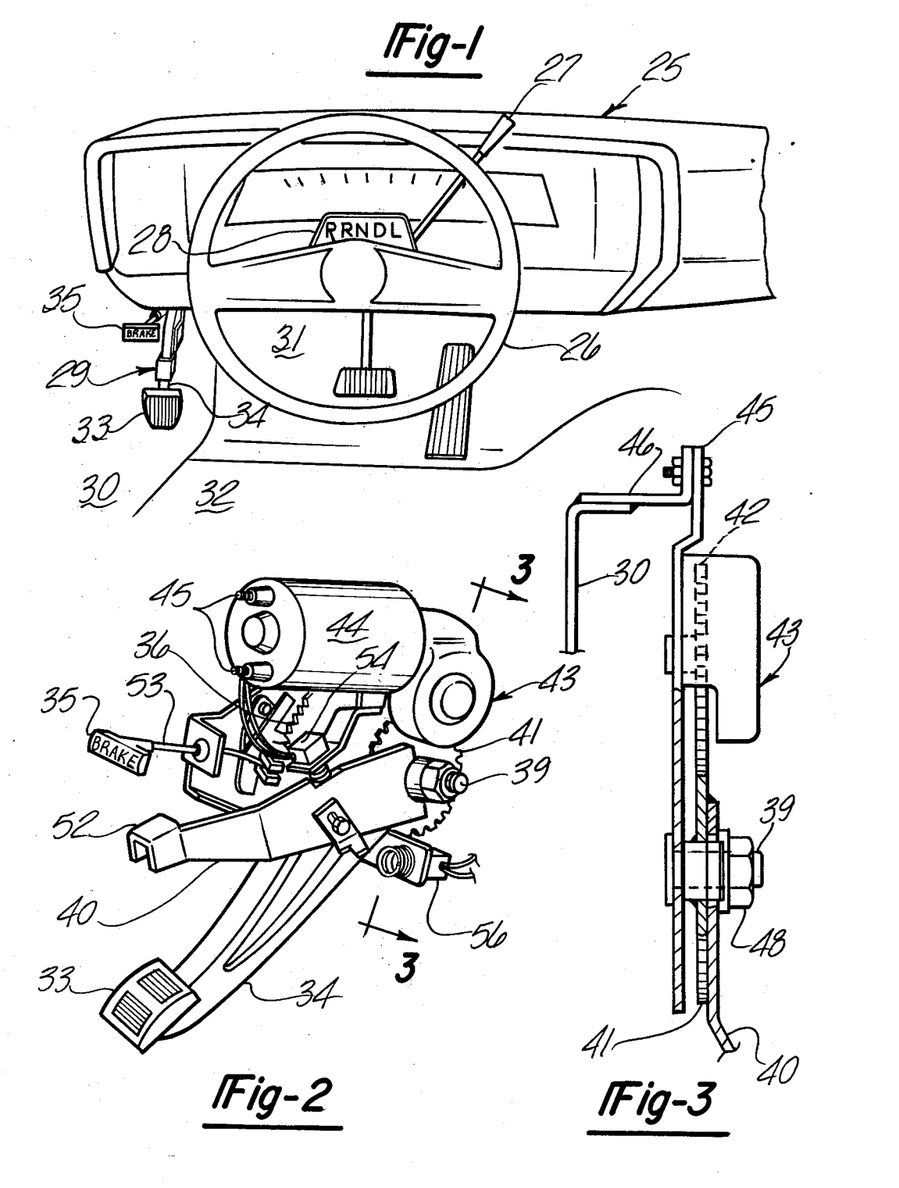
FIG. 1 is an elevational view of a typical automobile dashboard showing the pedal operated parking brake assembly mounted adjacent the lower left-hand corner thereof.
FIG. 2 is a perspective view of a construction embodying my invention formed integrally with the parking brake assembly as an original equipment item for installation on a motor vehicle.
FIG. 3 is a sectional view taken in the direction of the arrows along the section line 3—3, as shown in FIG. 2.

Referring now to FIG. 1, there is shown the standard automobile dashboard layout. The dashboard assembly generally designated by the numeral 25 customarily has the steering wheel 26 located at the left-hand end thereof with a transmission lever 27 mounted on the steering column (not shown) and having a transmission selector 28 mounted thereon. The standard parking brake assembly, generally designated by the numeral 29, is mounted below the dashboard 25 somewhat intermediate the dashboard and the floor 32, and somewhat to the right of the left wall 30 and forward of the fire wall 31.

The parking brake assembly 29 consists of the parking brake pedal 33, mounted to the parking brake arm 34 with a parking brake release 35 completing the assembly. The standard parking brake assembly is so well known in the art by this time that it is felt that additional description is not needed.

In order to have the parking brake on the motor vehicle applied automatically when the transmission lever is placed in a first predetermined position, such as its park position, very little additional apparatus is required. Already present is the parking brake arm 34 having a ratchet assembly generally designated by the numeral 36 consisting of a geared portion 37 of the upper end of the arm 34 and a stop means 38 (FIG. 4).

In addition to the apparatus already present, there is provided a frame member 45 mounted to the side wall 30 by the braces 46. There is provided thereon a shaft 39 having a common axis with the axis of rotation of the brake pedal arm 34. Such shaft is fixedly mounted to the frame member 45, and over the shaft 39 there is provided a bearing 47 over which the driven gear 41 and the lever arm 40 are rotatably mounted. It can be seen that the lever arm 40 is fixedly mounted to the driven gear 41, and this assembly is held in place by the nut or other suitable fastening means 48. The driven gear 41 is rotated by the driver gear 42 which is operated by the reducer 43 (see FIG. 3). It is operated by the reversible motor 44 by means of current supplied to it through the terminals 45. This entire apparatus may be considered as one embodiment of my invention and be called a brake application unit generally designated by the numeral 50.

Referring now to FIGS. 4–7, the preferred sequence of operation can be observed. It is noted that an on-off limit switch 54, which may be such as the one identified as the Model 1141-W and supplied by the Spemco Co. of St. Clair Shores, Mich., is provided in a position to be acted on by the parking brake arm 34 and is connected to the motor 44 to switch it off when the limit switch is contacted by the arm. A second on-off limit switch 56 is provided to be acted on by the lever arm 40 and to switch the motor off when the lever arm contacts said second on-off switch. A forward-reverse limit switch 55 is adapted to be operated on by a dog 61 fixedly mounted to the transmission lever column 62 and offset from the pointer 63 which works in relation to the selector 28.

Figure 4:
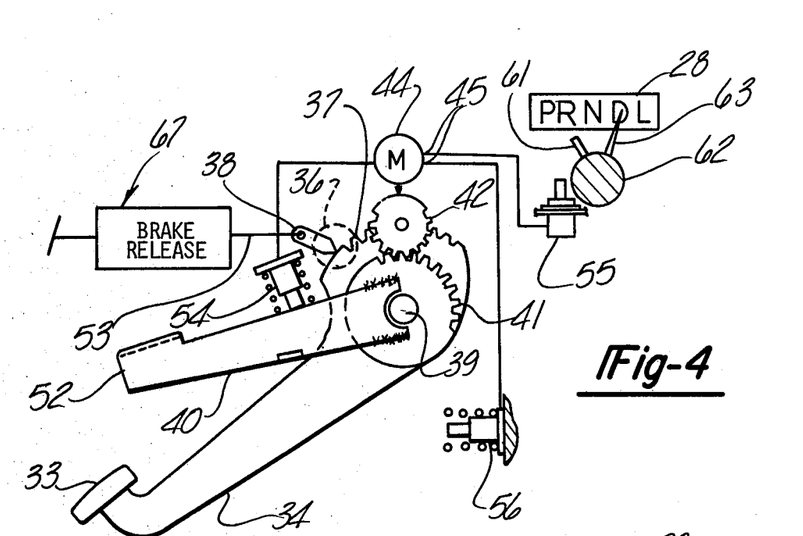
FIG. 4 is a diagrammatic view of the embodiment shown in FIG. 3 showing the assembly in its running position when the vehicle is proceeding down the highway.
Figure 5:
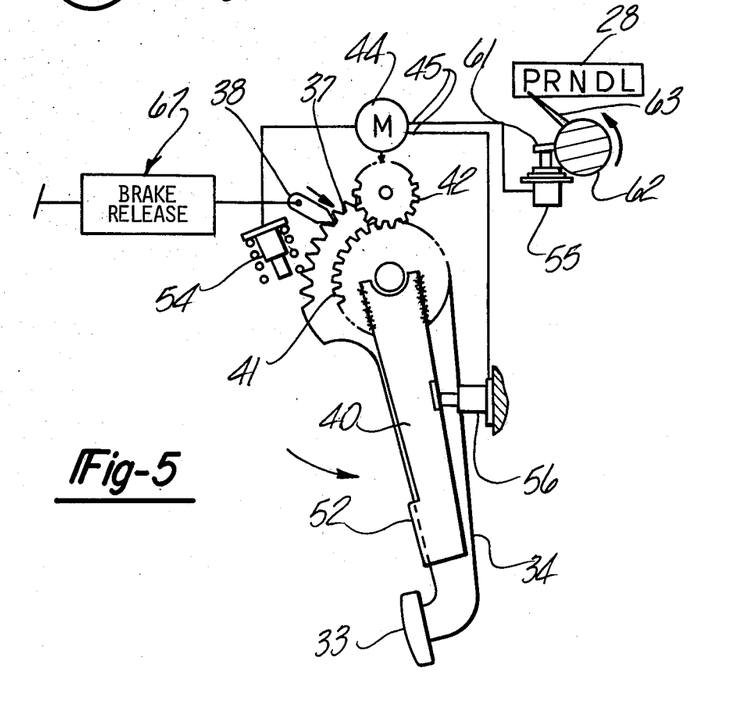
FIG. 5 is a diagrammatic view similar in part to that shown in FIG. 4, but showing the operation of a construction embodying my invention when the motor vehicle is stopped and the transmission lever is placed in a first predetermined position.

Initially, for purposes of illustration, let us assume that the motor vehicle to which my invention is mounted is in motion on the highway with the lever arm 40 and the parking brake arm 34 in their upper position, as shown in FIG. 4. The lever arm 40 can be seen contacting the on-off limit switch 54, thus resulting in no current being supplied to the reversible motor 44. Let us now assume that the driver wishes to park the motor vehicle which he has been driving. When the dog activates the forward-reverse limit switch 55, power is supplied from a source (not shown) to the reversible motor 44 through the terminals 45 causing the lever arm 40 to move in a downward position with the lower portion of the lever arm 52 engaging the parking brake arm 34 just above the pedal 33 when they meet. The arm continues downward causing the parking brake arm 34 to move with it until the lever arm 40 strikes the second on-off limit switch 56, causing current to be cut off from the motor 44. It is to be noted that while this is happening, the pawl 38 engages the gear 37, causing the parking brake arm 34 to stay in the downward position, and the motor vehicle parking brake assembly will now remain in this position as long as it is parked and the transmission lever remains a first predetermined position, such as the park position.

Figure 6:
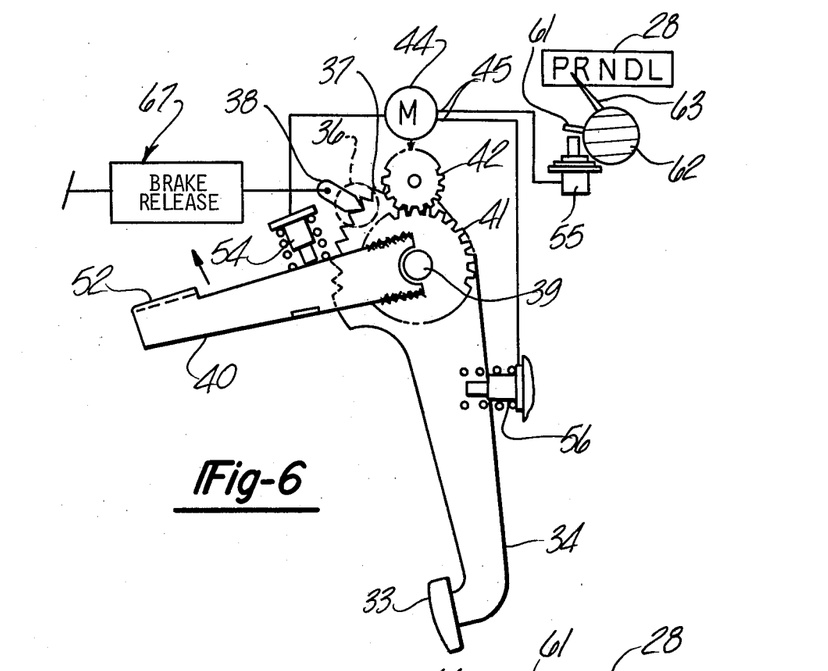
FIG. 6 is a diagrammatic view of the construction shown in FIGS. 4 and 5, but showing the device which applied the parking brake returning to its off position when the transmission lever of the parked vehicle is moved from a first predetermined position, such as the park position, to a second predetermined position other than the park position.

Referring now to FIG. 6, when the driver wishes to move the vehicle, it is the natural occurrence for him to start the motor of the vehicle and move the transmission lever to a second predetermined position, which may be any position other than the first predetermined position, as indicated by the pointer 63. At this point, the dog 61 releases the pressure from the forward-reverse limit switch 55, allowing current to flow to the motor 44 through the terminals 45, with the motor then rotating the driver gear 42, which rotates the driven gear 41, causing the lever arm 40 to go to its uppermost position, while leaving the parking brake arm in its lowermost position, i.e. with the parking brake still applied, preventing thus far the operation of the motor vehicle.

Figure 7:
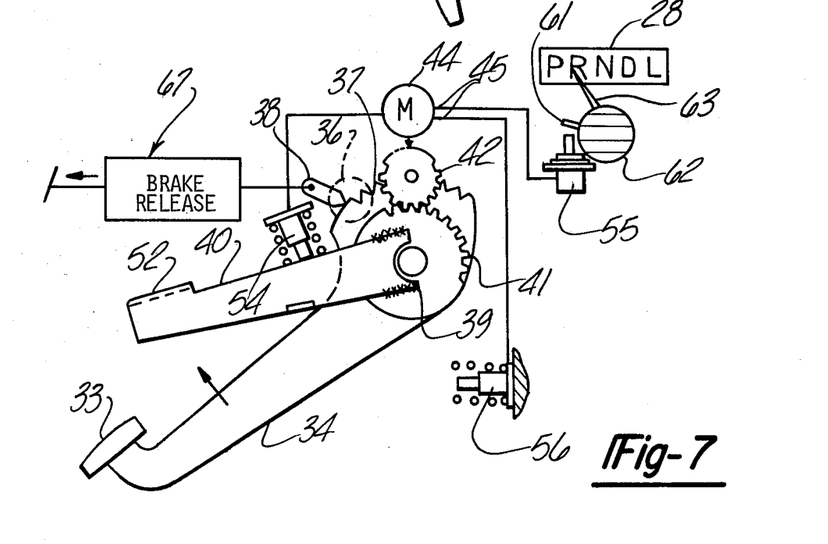
FIG. 7 shows how a parking brake of a motor vehicle having a contruction embodying my invention is manually released after the automatic transmission is placed in the reverse position so that the motor vehicle is ready to drive.

The operator of the motor vehicle must now release the ratchet assembly 36 holding the parking brake arm and pedal in its applied position. This can be done as shown in FIG. 2 by merely pulling on the parking brake release 35 which moves the rod 53 which is connected to the pawl 38. When the pawl 38 is moved to a position of disengagement with the gear 37, the parking brake arm and pedal assembly, 33 and 34 respectively, can move to their upward position as shown in FIG. 7, thus releasing the parking brake and allowing the operator to move the motor vehicle.

Figure 8:
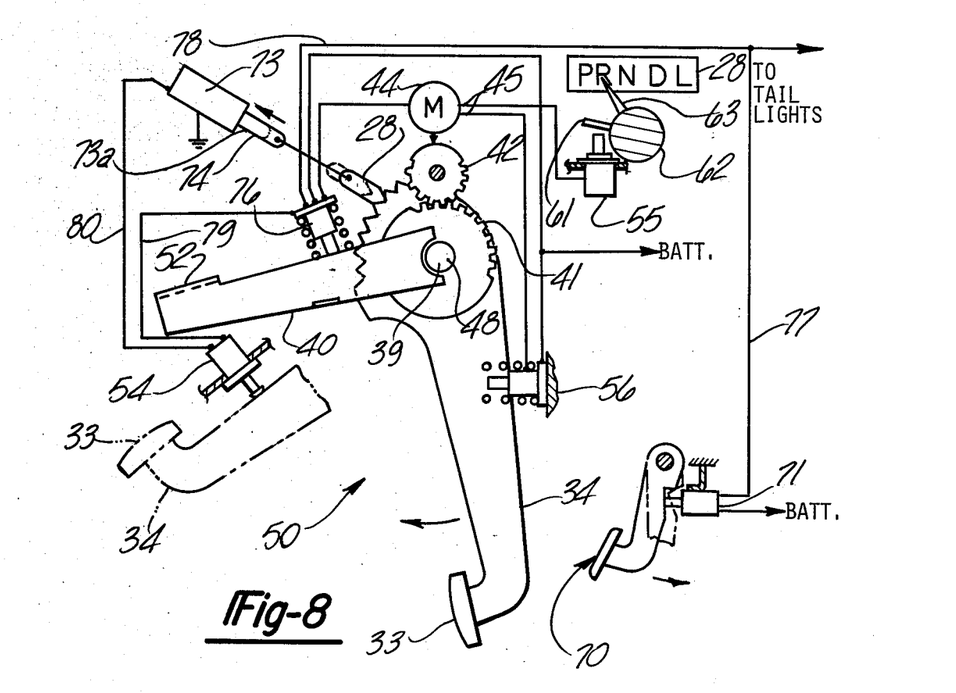
FIG. 8 is a diagrammatic view of a construction embodying my invention and having an automatic parking brake release mechanism, as contrasted to the manual release shown in FIG. 7.

It is also contemplated that some type of automatic parking brake release may be employed, and this brake release is indicated generally in FIGS. 4–7 by the numeral 67. An embodiment of this which has been shown to work satisfactorily is shown in FIG. 8. It is assumed for the purposes of illustration that previous to the operation shown in FIG. 8, the system was in the condition shown in FIG. 6 wherein the transmission lever has been put in the neutral position. In this case I take advantage of a naturally occurring sequence of events wherein while the driver is moving the transmission lever from the park to the neutral, and then to the drive position. In an automotive vehicle equipped with an automatic transmission he will naturally put his foot on the normal service brake assembly, generally indicated by the numeral 70, to prevent the vehicle jumping ahead when the transmission is in the drive position. As before, the dog 61 has released the pressure on the forward-reverse limit switch 55, causing current to flow to the motor 44 through the terminals 45. This, in turn, causes the motor 44 to drive the driver gear 42, causing the driven gear 41 to rotate about the shaft 39 in a clockwise position, causing the lever arm 40 to move to its upward position, thereby allowing extraneous forces to be removed from the parking brake arm 34 in view of its impending release.

Figure 8A:
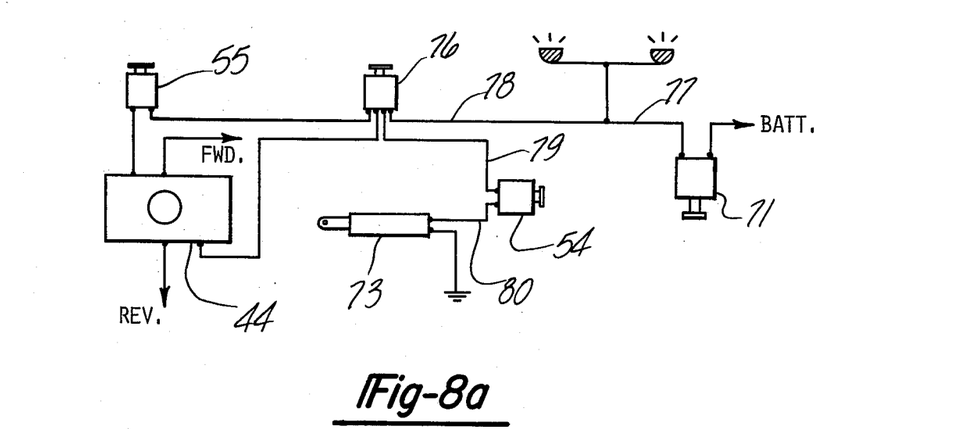
FIG. 8A is a schematic view of the construction shown in FIG. 8.

It is contemplated that some drivers may not like the inconvenience of having to manually release the parking brake every time they wish to start the car, and in FIG. 8 there is shown a way of automating the brake release mechanism generally indicated by the numeral 67 in FIGS. 4–7. In this case, a solenoid 73 is provided to work the pawl 28, and the rest of the mechanism remains substantially the same, although the wiring of the limit switches, and the use of brake light switch 71 is added to the mechanism in a manner to be described immediately below. Also, a reverse-limit switch 76 is added to be contacted by the lever arm 40, and the first on-off limit switch 54 is now contacted by the parking brake arm 34. In this case, when the driver of the motor vehicle moves the transmission lever column 62, causing the pointer 63 to move from the park to and through the reverse position to the neutral position on the way to the drive position, it is only normal for the vehicle operator to depress the brake pedal assembly 70 to prevent the vehicle from jumping forward. This actuates the brake light switch 71 which sends current through the wires 77 and 78 to the reverse limit switch 76. As shown by the schematic diagram shown in FIG. 8A, this switch has two sides, a normally on side and a normally off side. When the brake light switch is depressed, sending current to the normally off side of the reverse-limit switch 76, it finds that the normally off side is now on by virtue of the lever arm 40 depressing the switch 76 so current will flow through the reverse limit switch 76 through wire 79 to the on-off limit switch 54. Since the parking brake pedal is still depressed, this switch is in its on position allowing current to continue to flow through the wire 80 to the solenoid 73 and operate said solenoid to remove the pawl 28 from the gear 37. This solenoid will keep in its retracted position until the parking brake arm 34 releases and contacts switch 54, turning it to its off position, which stops the flow of current through the wire 80, and causes the solenoid to deactivate, replacing the pawl 28 in the gear 37. At the same time this is happening, the second on-off limit switch 56 has now gone to a normally on position, therefore conditioning the reversing motor 44 to operate in the forward condition in the next cycle of the automatic application of the parking brake when the dog 61 would activate the forward-reverse limit switch 55. Therefore, utilizing this apparatus provides the operator of the motor vehicle with the added convenience he desires.

Figure 9:
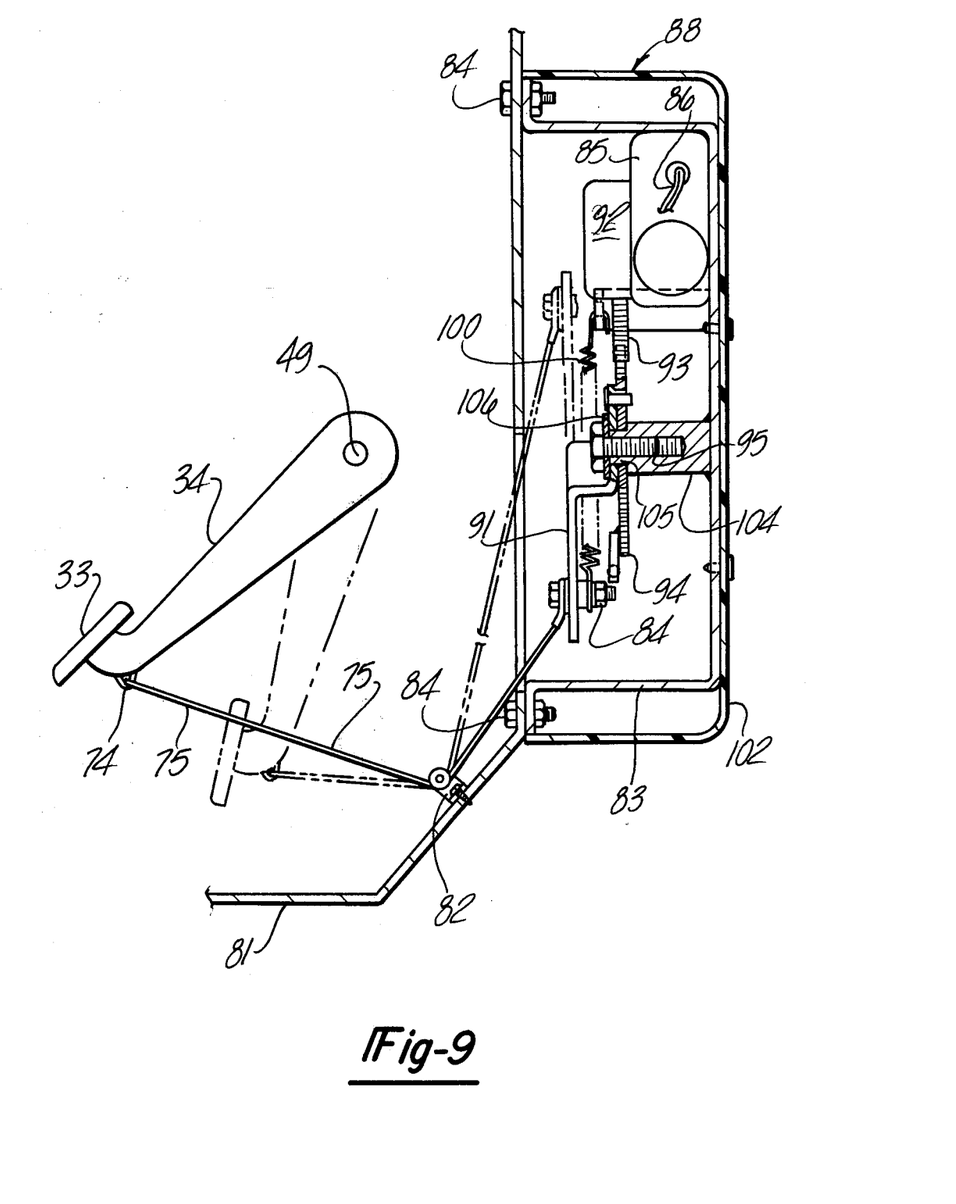
FIG. 9 is a diagrammatic view, partially in section, showing an alternate embodiment of my invention which may be used in cars already in use.
Figures 10, 11:
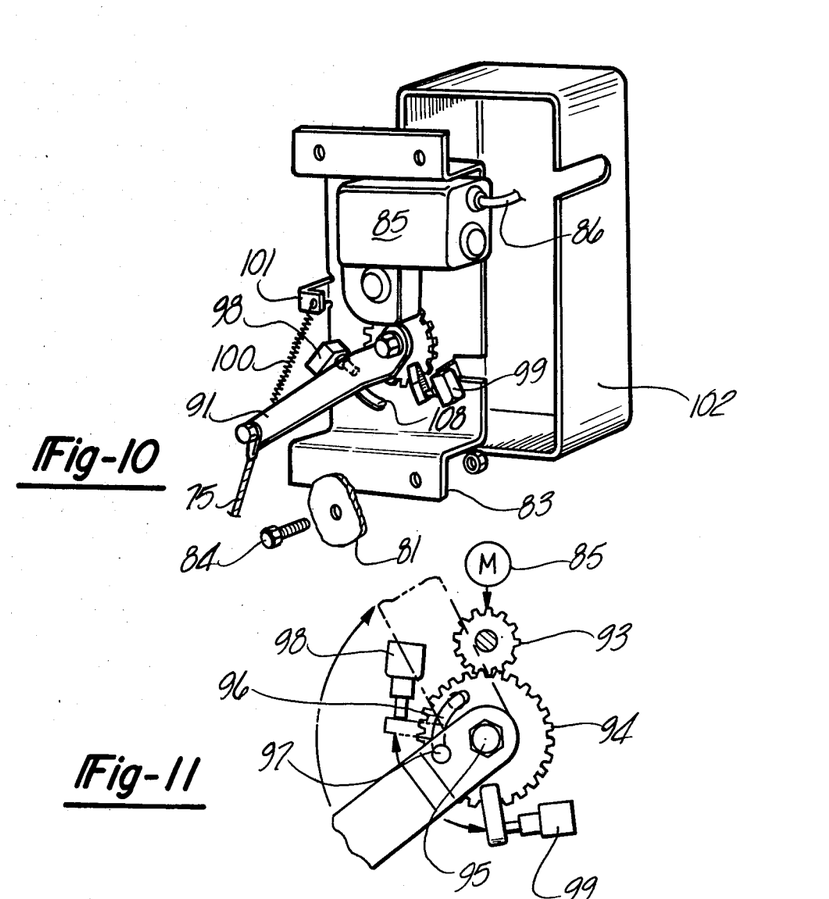
FIG. 10 is a perspective view of the device shown in FIG. 9.
FIG. 11 is a diagrammatic view showing the operation of the actuating lever shown in FIG. 10.

For older type motor vehicles which do not have the now common parking brake heretofore illustrated, a bolt-on unit generally designated by the numeral 88 is provided. This unit is illustrated in FIGS. 9–11 and consists of a frame member 83 which is bolted to the bulkhead 81 of the automobile. For purposes of illustration, I have shown this unit bolted on the outside of the bulkhead, as it is contemplated that in many cases there will not be room for it underneath the dashboard. However, I have also successfully made a model of such a unit that fits under the dashboard of the car and it is well within the scope of the present invention that this bolt-on unit be mounted either inside or outside of the passenger compartment of the automobile.

The frame member 83 is bolted to the bulkhead 81 by any suitable fastening means such as the bolt-and-nut assembly 84. To the frame member there is mounted in any suitable fashion a motor 85 supplied with current supplied to it through the wire 86. A gear reducer 92 is operatively mounted to the motor and operates a driver gear 93. A driven gear 94 is rotatably mounted to a shaft 104 which has been welded to the frame member 83. A reduced portion 105 of the shaft 104 is utilized for this rotational movement, as well as to provide for the mounting of the lever 91 which is caused to rotate when the pin 97 mounted in the lever 91 comes to the end of the slot 96 provided in the gear 94. Suitable limit switches 98 and 99 are adapted to be contacted by the lever 91 to start and stop the operation of the bolton unit in the manner just described for the original equipment unit.

The connections to the switches 98 and 99 are substantially similar to that just described for the bolt-on unit, and it is felt that these need not be described further, except to note that the limit switch 98 is adjustably mounted in the slot 108, because in this case adjustment for the travel of the parking brake must be made from car to car since this is a universal type unit, and after mounting the frame member 83 to the bulkhead 81, one would have to determine the range of travel of the lever 91, and then adjust the adjustable limit switch 98. The lever 91 is connected by the cable 75 through the pulley assembly 82 to the loop 74 provided on the parking brake arm 34. It can be seen that in operation, when the automatic transmission lever is placed in a first predetermined position, such as the park position, the motor 85 drives the driven gear 93 in a counterclockwise position as illustrated in FIG. 11, causing the gear 94 to rotate in a clockwise position, causing the pin 97 to move and rotate the lever 91 into an upward position as shown by the phantom lines in FIG. 9.

The arm in this case will stay up because of the tension of the spring 100, as well as the position of the pin 97. When the operator of the motor vehicle desires to move it, he will move the transmission lever out of park position in a manner similar to that just described wherein the dog 61 on the transmission lever releases pressure on the forward reverse limit switch 55, and the motor 85 is caused to rotate the driven gear 94 in a counterclockwise position until the first dog 95 on the gear 94 strikes the fixed limit switch 99, causing the motor 85 to stop.

In this case, the lever 91 stays up solely because of the tension of the spring 100, while the gear has rotated to a position allowing the lever 91 to go to a lower position when the parking brake is released. Thus, all the operator needs to do now is manually release the parking brake, after which the parking brake arm 34 will come up in the position shown in the solid line in FIG. 4, and the cable 75 will pull the lever 91 to its lower position, and the vehicle is then ready to resume motion. It is also quite clear that an automatic type release similar to that just described in regard to FIG. 8 for this bolt-on unit is well within the scope of the present invention.

A cover 102 is provided when necessary to protect the components of the bolt-on unit from damage. As shown in FIG. 9, the cover may be attached to the frame member 83 by any suitable fastening means.

Another modification of my invention is possible where the service brakes of the vehicle are hydraulic in nature and are in good condition, i.e. the master cylinder or the wheel cylinders do not leak, or where the service brakes of the vehicle are mechanical in nature. This modification is illustrated in FIGS. 12-16.

Figure 12:
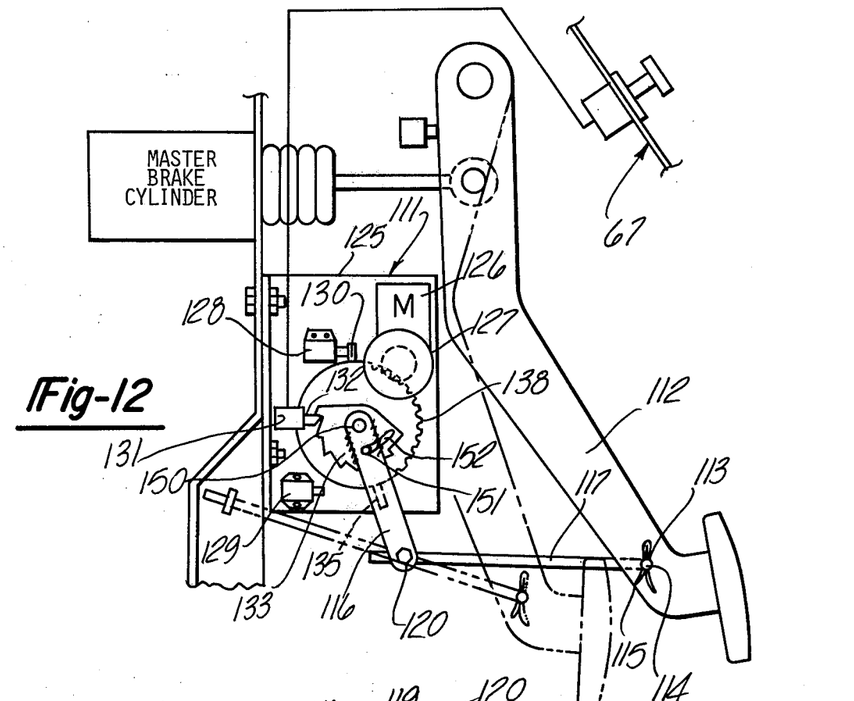
FIG. 12 is an elevational view of a construction embodying the present invention adapted to automatically apply the service brake of a vehicle when the transmission lever is placed in a first predetermined position, such as the park position.

I have provided a method and apparatus for removing the parking pawl from the transmission and automatically applying the service brake when the transmission lever is placed in a first predetermined position, such as the park position. In this case, the brake pedal is depressed mechanically each time the automatic transmission is placed in the park position. This is accomplished by the service brake unit generally designated by the numeral 111 depressing the brake pedal by means of the rod 117 which is fixedly but rotatably connected to the brake pedal 112 by means of a shaft 114 placed through a hole in the pedal 113 and held in place by a cotter pin. It is, of course, understood that the rod 17 may be affixed to the brake pedal 112 in any suitable manner as long as it is fixedly but rotatably held.

Figure 13:
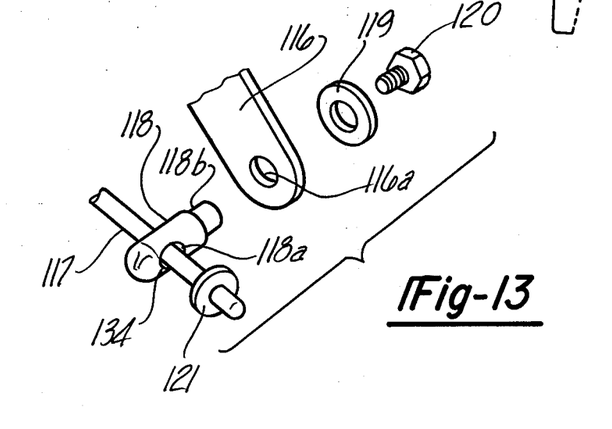
FIG. 13 is a partial exploded view of the construction shown in FIG. 12 emphasizing the connection between the operating lever of the device shown in FIG. 12 and the connecting rod thereof.
Figure 14:
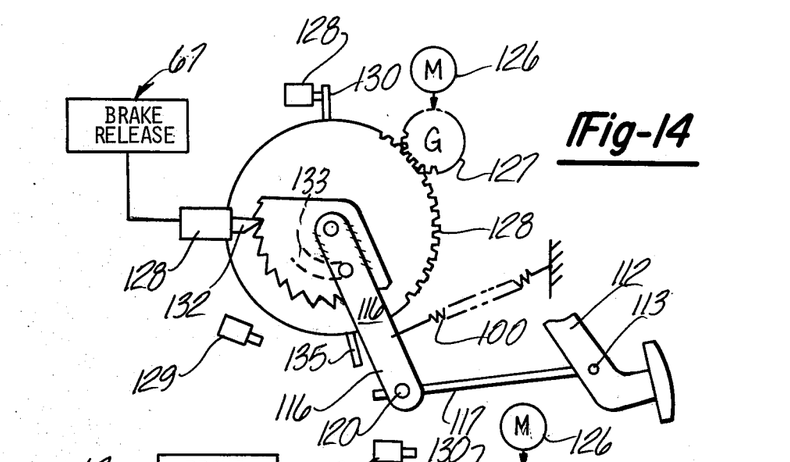
FIG. 14 is a diagrammatic view of the construction shown in FIG. 13 in its off position.

The rod 117, however, is affixed to the arm 116 in a more sophisticated manner. A hole 116a is provided in the end of the arm 116, and a swivel shaft 118 having a hole 118a provided therein and having a reduced portion 118b is placed in the hole 116a. A washer is then passed over the reduced portion 118b which has a diameter slightly smaller than the hole 116a, and the bolt 120 is tightened thereto. This provides for rotatable motion of the shaft 118. I call this particular mounting a swivel shaft because the hole 134 is larger diameter than the shaft 117 and the shaft 117 is free to rotate therein.

To the service brake unit 111 is mounted a motor 126 which drives a driver gear 127 which is operatively connected to drive a large gear 138 which is rotatably mounted to the shaft 150. Also rotatably mounted to the shaft 150 is the ratchet gear 133. The arm 116 having a first dog 130 and a second dog 135 is fixedly attached to the ratchet 133. These dogs are adapted to strike a first service brake limit switch 128 and a second service brake limit switch 129 respectively. A pawl 132 operated by a spring loaded solenoid 131 engages the ratchet gear 133. A manual or automatic parking brake release 67 similar to those just described is utilized and may be mounted to dashboard or in other suitable locations. Tension is maintained on the arm 116 by virtue of a spring 100 mounted between the arm 116 and a suitable fastening location. In the normal driving position of the automobile illustrated in FIG. 14, the lever 116 would be in its fully forward position by virtue of the pin 151 striking the end of the slot 152 and being moved by the movement of the large gear 138 in a manner similar to that just described.

By virtue of the method of mounting the rod 117 to the lever 116, and the parking brake assembly 112, the normal operation of a service brake 112 would continue with the rod 117 just sliding through the swivel shaft 118 whenever it was applied. However, when the operator of the motor vehicle wished to park the motor vehicle, since the pawl of the automatic transmission has been removed, he would place the transmission lever in the park position, which would cause the motor 126 to operate the driver gear 127 to operate in a counterclockwise position as shown at least in FIG. 15 and rotate the large gear 138 in a clockwise position. Since the lever 116 is moved by gear 138, it would move in a clockwise position also bringing the swivel shaft 128 against the stop 121 after a short amount of rotation, and with the rotation continuing would cause it to retract the rod 117 and cause the brake pedal 112 to be depressed by virtue thereof. The rotation of the large gear 138 and arm 116 would continue until the second dog 135 operated the second service brake limit switch 129, causing the motor 126 to stop rotation. A switch (not shown) will also be activated to turn off the brake lights of the motor vehicle while the unit is in operation.

Figures 15, 16:
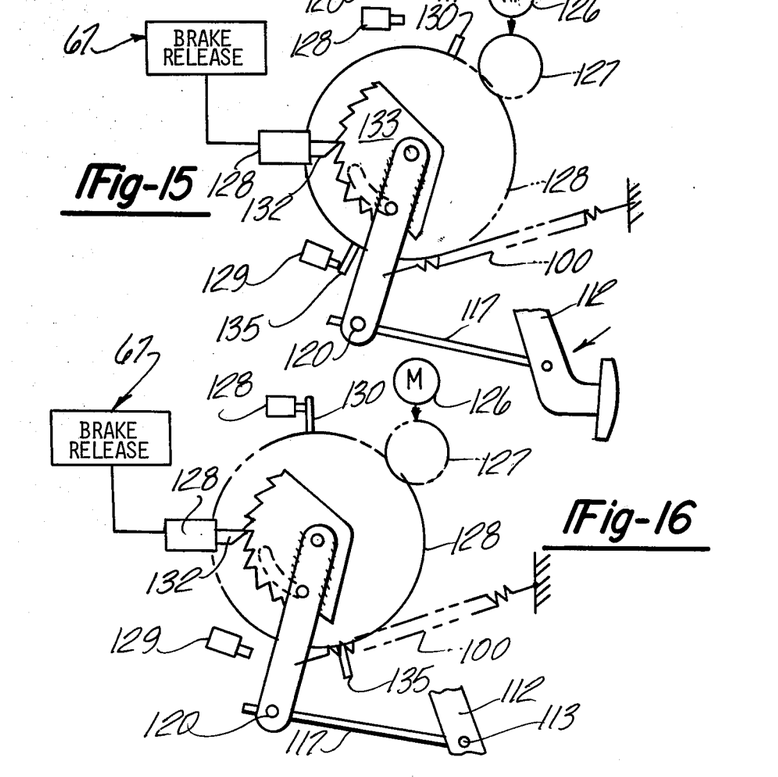
FIG. 15 is a diagrammatic view of the construction of FIG. 13 after the service brake has been applied by placing the transmission lever in a first predetermined position.
FIG. 16 is a diagrammatic view similar to that shown in FIG. 15, but showing the mechanism in its partially released position, when the transmission lever is placed in a position other than said first predetermined position.

The assembly would remain in this position until the transmission lever was moved to a second predetermined position. When the transmission lever is moved out of the park position by the operator, thus returning the forward-reverse limit switch 55 (not shown) to its normal condition, the motor 126 and the gear 127 are caused to rotate in the opposite direction as shown in FIG. 16. If an automatic brake release 67 is used, this would cause the solenoid 128 to operate and retract the pawl 132, thus allowing for the motor to operate in the manner just described.

If a manual brake release is used, a similar sequence of operation takes place except that the operator must manually release the pawl 132 before moving the transmission lever out of the park position, in either case, the operation of the forward-reverse limit switch 55 (not shown) would cause the motor and gear 126 and 127, and thus the large gear 138, to operate in the opposite direction until the first dog 130 struck and operated the first service brake limit switch 128, which would stop the operation of the assembly 112 and allow normal operation of the service brake once again.

Thus, by abandoning the use of the pawl in the automatic transmission equipped vehicle and the placing of the gearshift lever in a position other than neutral in a manually equipped transmission vehicle, both of which proved ineffective in overcoming the vehicle operator's reluctance to use the parking brake of the vehicle, and providing for the parking brake or service brake of the vehicle to automatically be applied when the transmission lever of an automatic transmission vehicle is placed in a first predetermined position or the manual transmission lever is placed in neutral or other predetermined position, I have provided a new and novel method of immobilizing a motor vehicle and have attained the foregoing object and many additional objects of the present invention.

I claim:

1. A method of automatically applying and releasing the parking brake on a transmission equipped vehicle, said method including the steps of placing the selector lever of said transmission into a first predetermined position, and causing said parking brake to be applied when said lever is placed in said predetermined position, when desired, removing said selector lever from said first predetermined position and placing it in a second predetermined position without causing said parking brake to be released, and causing said parking brake to be automatically released only when the service brake of said vehicle is applied simultaneously or subsequently to placing said lever in said second predetermined position, but prior to said vehicle resuming motion.

2. The method defined in claim 1, wherein said transmission is an automatic transmission.

3. The method defined in claim 2, wherein said first predetermined position is the park position.

4. The method defined in claim 3, wherein said second predetermined position is a position other than the park position.

5. In combination in a vehicle equipped with a transmission and a selector lever for said transmission, a parking brake having a brake pedal arm and a service brake, an apparatus for automatically applying the parking brake on said vehicle when the transmission thereof is placed in a first predetermined position, said apparatus including means activated by said selector lever to cause said parking brake to be automatically applied when said selector lever is placed in a first predetermined position, means to cause said parking brake to remain applied when said selector lever is removed from said first predetermined position to a second predetermined position, and means to automatically release said parking brake of said vehicle when said service brake is applied simultaneously or subsequently to placing said lever in said second predetermined position, but prior to said vehicle resuming motion.

6. The apparatus defined in claim 5, wherein said means to cause said parking brake to be automatically applied includes a brake application unit.

7. The device defined in claim 6, wherein said brake application unit includes a frame member mounted by suitable means to the side wall of said vehicle adjacent said parking brake arm, a shaft having a common axis of rotation with said parking brake arm fixedly mounted to said frame member, a bearing mounted about said shaft, a driven gear and a lever arm rotatably mounted on said bearing with suitable fastening means holding said lever arm and said driven gear on said bearing, with said lever arm fixedly mounted to said driven gear, a gear reducer mounted to said frame member and including a driver gear, said driver gear being rotatably engaged with said driven gear, a first on-off limit switch mounted to said parking brake assembly and adapted to be activated when said parking brake arm is in its uppermost position, a second on-off limit switch mounted to said parking brake assembly and adapted to be activated when said lever arm is in its lowermost position, a forward-reverse limit switch mounted adjacent the transmission lever column of said transmission, said first on-off limit switch being connected by any suitable means to a forward-reverse motor, said second on-off limit switch and said reversing limit switch also being connected to said reversing motor, a dog mounted on said transmission lever column and adapted to activate said forward-reverse limit switch, a geared portion formed in the upper end of said parking brake arm, a pawl mounted operatively adjacent said geared portion and adapted to selectively engage the same, and wherein said means to automatically release said parking brake includes a parking brake release mechanism connected to said pawl, all adapted to cause said reversing motor to cause said lever arm to operate and apply said parking brake when said forward-reverse limit switch is operated by said dog, and continue until said lever arm contacts and operates said second on-off limit switch.

8. The device defined in claim 7, wherein said forward-reverse limit switch is also connected to said reversing motor and adapted to cause said reversing motor to operate and retract said lever arm upon the placing of the selector in a second predetermined position and the releasing of the pressure on said forward-reverse limit switch by a dog, and to continue to operate in such manner until said lever arm contacts a reverse limit switch.

9. The device defined in claim 8, wherein said parking brake release mechanism is automatic in nature and automatically disengages said pawl and causes said parking brake to go to its normally off position upon said selector being placed in a second predetermined position, and the driver of the vehicle applying the brakes of said motor vehicle.

10. The device described in claim 9, and including a solenoid operatively connected to said pawl, said reverse limit switch operatively mounted adjacent the upper position of said lever arm and having multiple inputs and outputs, one of which is connected to said forward-reverse motor and another input of which is connected to a service brake light switch, said reverse limit switch also connected to said second on-off limit switch, and to said first on-off limit switch, all adapted to cause said lever arm to move from its fully off position when said selector is placed in a second predetermined position, and to operate said solenoid when said service brakes are applied.

11. The device defined in claim 6, wherein said brake application unit is in the form of a bolt-on device, including a bolt-on frame member fixedly mounted to a bulkhead of said motor vehicle, a shaft fixedly mounted to said frame member and having a reduced portion at one end thereof, a lever and driven gear rotatably mounted on said reduced portion of said shaft, and a bolt and washer assembly holding said lever and said gear to said shaft, a pin provided in said lever and an arcuate slot provided in said driven gear to accept said pin and to provide for driving of said lever, a driver gear operatively mounted to said frame member to engage said driven gear, a gear reducer connected to said driver gear, and a motor connected to said reducer and supplied with electric current by suitable means, a pulley assembly mounted to said bulkhead of a motor vehicle, a loop mounted to said brake pedal arm, a cable fixedly mounted to said loop passing around said pulley assembly and fixedly mounted to said lever, a spring interposed between the end of said lever and said frame member, a first dog provided on said driven gear, a fixed limit switch fixedly mounted to said frame member adjacent said driven gear and adapted to be operated by said dog, said arcuate slot provided in said driven gear having a center at said shaft, a second dog mounted to said driven gear, and an adjustable limit switch mounted adjacent said slot, and adapted to be operated by said second dog, said adjustable limit switch and said fixed limit switches being connected to cause said driven gear to rotate and engage said lever and rotate the same, thus applying said parking brake until said second dog contacts said adjustable limit switch when said transmission lever is placed in said first predetermined position.

12. The device defined in claim 11, and adapted to cause said driven gear to rotate in the opposite direction until said first dog contacts said fixed limit switch, when said lever is placed in a second predetermined position and said service brake is applied.

* * * * *